(12) United States Patent
Kurz

(10) Patent No.: US 10,612,697 B2
(45) Date of Patent: Apr. 7, 2020

(54) PRESS SEAL WITH PRESSING BODY

(71) Applicant: HAUFF-TECHNIK GMBH & CO. KG, Hermaringen (DE)

(72) Inventor: Ralf Kurz, Giengen (DE)

(73) Assignee: Hauff-Technik GmbH & Co. KG, Hermaringen (DE)

( * ) Notice: Subject to any disclaimer, the term of this patent is extended or adjusted under 35 U.S.C. 154(b) by 0 days.

(21) Appl. No.: 16/329,536

(22) PCT Filed: Aug. 30, 2017

(86) PCT No.: PCT/EP2017/025245
§ 371 (c)(1),
(2) Date: Feb. 28, 2019

(87) PCT Pub. No.: WO2018/041414
PCT Pub. Date: Mar. 8, 2018

(65) Prior Publication Data
US 2019/0195396 A1    Jun. 27, 2019

(30) Foreign Application Priority Data
Aug. 30, 2016 (EP) .................................... 16020317

(51) Int. Cl.
*F16L 5/08* (2006.01)
*H02G 3/22* (2006.01)
*F16J 15/06* (2006.01)

(52) U.S. Cl.
CPC .................. *F16L 5/08* (2013.01); *H02G 3/22* (2013.01); *F16J 15/061* (2013.01); *F16L 2201/10* (2013.01)

(58) Field of Classification Search
CPC ....... F16L 55/132; F16L 5/08; F16L 2201/10; H02G 3/22; F16B 31/02; F16J 15/061
(Continued)

(56) References Cited

U.S. PATENT DOCUMENTS 3,528,668 A    9/1970 Barton
4,457,517 A *  7/1984 Dunegan ................ F16J 15/002
                                                       277/608
(Continued)

FOREIGN PATENT DOCUMENTS

CN          1138674 A       12/1996
CN        102057199 A        5/2011
(Continued)

*Primary Examiner* — Nicholas L Foster
(74) *Attorney, Agent, or Firm* — Wood, Phillips, Katz, Clark & Mortimer

(57) ABSTRACT

A press seal (1) with an elastomer body (2) includes a press body (9, 10) which can be pressed against the elastomer body (2) by tightening a clamping bolt (4) and as a result, the elastomer body (2) is sealed on a line. The pressing body (9, 10) includes a display element (11) which can be visible in a display range (18) when a clamping state of the elastomer body (2) is reached. The pressing body (9, 10) includes a first (13) and a second press body part (14) movably mounted with respect to each other in an axial direction (3) parallel to the longitudinal axis (7) of the clamping bolt (4) such that when the elastomer body (2) is in the clamped state, it adopts a relative position modified with respect to the non-clamped initial state, which can be read on the display element (11).

14 Claims, 3 Drawing Sheets

(58) Field of Classification Search
USPC .................. 277/606, 616, 619, 620, 621
See application file for complete search history.

(56) References Cited

U.S. PATENT DOCUMENTS

| | | | |
|---|---|---|---|
| 5,249,604 A | 10/1993 | Keating | |
| 5,297,691 A | 3/1994 | Bottcher | |
| 5,437,310 A | 8/1995 | Cunningham | |
| 6,003,557 A | 12/1999 | Brelig et al. | |
| 6,869,081 B1 * | 3/2005 | Jenco | F16L 23/003 277/611 |
| 8,141,913 B2 * | 3/2012 | Kern-Emmerich | F16L 13/141 285/242 |
| 9,709,205 B2 * | 7/2017 | Delikostas | F16L 5/08 |
| 2007/0075504 A1 * | 4/2007 | Kurz | F16L 5/02 277/606 |
| 2009/0218814 A1 * | 9/2009 | Kern | F16L 13/141 285/382.2 |
| 2010/0175271 A1 * | 7/2010 | Lundborg | F16L 5/08 33/613 |
| 2010/0289256 A1 * | 11/2010 | Shumard | F16L 21/03 285/18 |
| 2013/0320631 A1 * | 12/2013 | Vastmans | G02B 6/4444 277/616 |
| 2016/0195210 A1 | 7/2016 | Delikostas et al. | |
| 2018/0252338 A1 * | 9/2018 | Kurz | F16L 5/08 |

FOREIGN PATENT DOCUMENTS

| | | |
|---|---|---|
| EP | 1 211 450 A1 | 6/2002 |
| EP | 2 829 781 A1 | 1/2015 |
| JP | 49-026531 B1 | 7/1974 |
| JP | 63-88729 U | 6/1988 |
| WO | 96/35904 A1 | 11/1996 |
| WO | 2005/119111 A1 | 12/2005 |
| WO | 2007/097706 A1 | 8/2007 |
| WO | 2009/139713 A1 | 11/2009 |
| WO | 2015010822 A1 | 1/2015 |

* cited by examiner

PRESS SEAL WITH PRESSING BODY

FIELD OF THE INVENTION

The present invention relates to a press seal for sealing against a line, the press seal comprising an elastomer body, a press body and a tensioning bolt.

BACKGROUND OF THE INVENTION

A press seal discussed here can for instance be constructed such that the tensioning bolt intersects the elastomer body in parallel to the line and respectively holds one press body at each of the two front faces of the elastomer body, which lie opposite to each other. By tensioning the tensioning bolt, the press bodies are moved towards each other in the axial direction of the tensioning bolt, the elastomer body being compressed in the same direction and, perpendicularly thereto, contacting the line and for instance the soffit of a wall opening, for example of a core drilling. This shall illustrate a possible press seal, it shall not limit the scope of the subject matter.

From EP 2 829 781 A1 a press seal is known with a press body comprising a display element, from which a force transferred onto the elastomer body can be read out. This display element can be designed and coupled to the elastomer body in different ways, however the display region is always at the upper side of the press body, namely exposed in the axial direction of the tensioning bolt. Therefore, reading it out is possible in a top view, looking along the axial direction onto the press body.

BRIEF SUMMARY OF THE INVENTION

The present invention is to solve the problem to provide a particularly advantageous press seal having a press body with a display element.

According to the invention, this problem is solved by a press seal with a press body having the display region, in which the display element becomes visible upon reaching the appropriate tensioned state, laterally at the side, exposed outwards in a direction perpendicular to the longitudinal axis of the tensioning bolt.

Preferred embodiments are subject of the dependent claims and of the whole disclosure, which relates to apparatus and method aspects, as well as use aspects, at the same time; at least implicitly, the disclosure relates to all claim categories.

The display region arranged laterally at the press body can extend or improve the use properties of the press body. In case of a limited accessibility of the press seal, for instance when the respective line is led through the wall close to the floor or under another limited space condition, an assembly inspection is possible nevertheless, namely in a viewing direction obliquely from the side. In this case, for instance, the technician does not have to kneel down to look onto the press body in a top view, instead he can see the display region obliquely from above (in the reference system of the technician, laterally in the reference system of the press body), which is the typical viewing direction during the installation anyway.

Around the "longitudinal axis" the tensioning bolt is rotated during the tensioning. The thread of the tensioning bolt extends helically around its longitudinal axis. The press seal is preferably constructed such that a screw head of the tensioning bolt is in contact with the press body which comprises the display element, wherein a washer can for instance be arranged between the screw head and the press body, the washer would be considered as a part of the tensioning bolt then. For driving the screw head, for instance a polygonal inner or outer contour can be provided, for example an external hex connection. With its thread, the tensioning bolt engages at a press body arranged at the opposite side opposite in a direction parallel to the longitudinal axis (referred to as "axial direction"). The tensioning bolt can comprise an outer thread, which can for instance engage in a nut inserted into the opposite press body or welded to a metal press body; preferably, the opposite press body is an injection molding part, wherein particularly preferred a metal nut is molded as an insert into the opposite press body in an undetachable manner.

The terms "above" and "below" relate to the axial direction to the parallel to the longitudinal axis of the tensioning bolt, which applies generally in this disclosure, unless indicated otherwise explicitly; therein the tensioning bolt shall, by definition, transfer the force "from above" onto the press body, the tensioning bolt being screwed "downwards" during the tensioning. Referring to a "lateral" arrangement relates, unless indicated otherwise, to a direction perpendicular to the axial direction, also referred to as "lateral directions". Therein, away from the press body is "outwards", and towards the press body is "inwards".

The display region is arranged laterally at the press body, for instance at a lateral outer surface of the press body, which extends along the axial direction, being for instance tilted by not more than 45°, 35° or 25° to the longitudinal axis (in the order mentioned increasingly preferred), seen in a sectional plane containing the longitudinal axis; as far as possible in technical practice, a parallel extension can be possible, even though a small tilt of for instance at most 5° or 10° is possible as well. The display element which becomes visible in the lateral display region is preferably moved into the display region in that lateral direction, in which the display region is exposed, and becomes visible during this movement into the display region.

Independently of these details, the display region is exposed in a lateral direction outwards, away from the press body; in this direction it is not covered by the press body itself, ideally it is neither covered by the elastomer body. As a result of the exposure, a technician can look laterally onto the display region (namely in exactly the opposite lateral direction). A corresponding line of sight does not necessarily intersect the longitudinal axis of the tensioning bolt but can also be offset parallelly (the criterion of claim 1 relates to a direction perpendicular to the longitudinal axis, in general it is not limited to a straight line perpendicular to the longitudinal axis); preferably, however, the display region is exposed in a line of sight lying perpendicular to the longitudinal axis of the tensioning bolt.

A "through opening" in which the line can be sealed with the elastomer body, can for instance be a through opening in a wall or floor element, but also in a tube element, for instance a protective tube, in which the line is guided, or in a mounting element serving for a mounting of the line. The through opening can for instance be "defined" by the material of the wall, floor, tube, or mounting element itself; however, also a frame or sleeve can be provided in the through opening, and the elastomer body can engage there.

The "line" can in particular be an electric or power supply line, a supply line, as for instance a gas, water, heat, or oil line, or a telecommunication or data line, in particular fibre based, and the term can also relate to an empty tube for receiving such a line. The line can preferably have a circular shape in a section perpendicular to the line direction, which preferably applies for the through opening as well, the elastomer body being preferably arranged in an annulus (sealing inwards against the line and outwards to the soffit of the through opening). Independently of these details, the press body, which can be pressed against the elastomer body, contacts the elastomer body preferably directly, having a contact area at the latter (in general, however, it could also be pressed against the elastomer body indirectly). In the tensioned state of the elastomeric body, which is visualized by the display element, the elastomer body has a sealing contact at the line, the tensioning being on the other hand not too large, to prevent a damage of the line or of the elastomer body.

In general, the press body could transfer the contact pressure also laterally, namely compress the elastomer body in a lateral direction for pressing it against a line. For this purpose, the elastomer body and the press body can be placed in the through opening together, wherein the press body is widened laterally by tensioning the tensioning bolt, pressing the elastomer body against a line. Preferably, however, the elastomer body is tensioned by a compression in the axial direction, contacting the line in the lateral direction consequently, see also the description above and the remarks on the prior art. In this case, the tensioning bolt does not only intersect the press body with the display element but also the elastomer body and a press body arranged opposite in the axial direction (the opposite press body having preferably no display element).

In a preferred embodiment, a lateral wall of the press body, at which the display region is provided, is, at least in the display region, made of a material which is at least translucent (enabling a shining through), preferably it is transparent (enabling a looking through), for instance made of acrylic glass or polycarbonate, preferably without any colouring agents respectively. When the desired tensioning is reached, the display element contacts the lateral wall on the inside, which is visible at the opposite outer surface due to the translucency or transparency. In the display region, the material which is at least translucent shall be permeable to light at least partly. It can for instance have a transmittance of at least 30%, further preferred at least 50%, 70% or 80%, possible upper limits being for instance not more than 99%, 95% or 90% (averaged over the visible spectral range respectively).

In general, however, the display region could for instance also be a through hole extending laterally through the lateral wall. In comparison, the translucent/transparent material can advantageously enable a press body closed outwards basically, which can prevent an entry of dirt or for instance an insect damage. The lateral wall can be translucent/transparent in the display region solely, forming an inspection window; however, it can also be translucent/transparent as a whole.

In a preferred embodiment, the press body comprises a first and a second press body part, wherein these press body parts are mounted movably in the axial direction. When the tensioned state is reached as desired, they are in a different relative position compared to the initial state (beginning of the tensioning of the tensioning bolt), which is indicated by the display element. This relative movement is not necessarily continuous, the two press body parts can also find the relative position abruptly ("digitally"), for instance when a material bridge provided for that purpose breaks or tears open. The display element could for instance also be a colour capsule, which could be arranged between the press body parts, so that the colour content becomes visible at a side after the capsule has burst, the colour content contacting for instance the inside of a lateral wall being translucent at least in a region.

In general, the relative movement of the press body parts is not necessarily limited to the axial direction, it shall have at least a directional component in the latter; however, preferably, the press body parts are mounted such that they are movable with respect to each other solely in the axial direction.

In a preferred embodiment, the press body parts movable with respect to each other are mounted via a deformation element, which is deformable in an elastic manner at least to some extent, even though for instance a viscoplastic contribution is possible as well. In this respect, the deformation element is an elastomer element (which is separate from the elastomer body of the press seal, namely multipart with the elastomer body). The deformation element is arranged between the press body parts and is compressed in the axial direction, hence widened laterally, when the tensioning bolt is tensioned.

In a preferred embodiment, the deformation element encloses the tensioning bolt, extending over a whole circumference around the longitudinal axis of the tensioning bolt (closed circumferentially). In a sectional plane perpendicular to the longitudinal axis, the deformation element has a ring shape, preferably the shape of a circular ring.

In a preferred embodiment, the deformation element is also the display element. In general, however, the deformation element and the display element could be multi-part with each other, the display element could for instance be a display pin or generally a stiff display body, that could be pushed outwards by the deformation element widening laterally and become visible in the display region. Preferably, the deformation element itself is the display element, a lateral outer surface of the deformation element becoming visible in the display region when the tensioned state is reached. Preferably, at least that part of the deformation element appearing in the display region has a clearly visible colour, namely a signal colour, for instance yellow, which preferably applies for the deformation element as a whole.

In a preferred embodiment, the press body is adapted such that the deformation element compressed between the two press body parts widens asymmetrically, namely widens more in a first lateral direction than in a second direction perpendicular thereto. From a non-tensioned initial state into the tensioned state, the deformation element can for instance widen by at least 10%, 20%, 30%, 40% or 50% more in the first lateral direction than in the second lateral direction; basically, the widening in the second lateral direction could also be blocked completely, even though possible upper limits for the widening in the second lateral direction could also be not more than 500%, 400% or 300%, for instance. In a sense, the deformation is guided into the first direction (for instance by a limitation in the second direction); in the first direction, the display region is arranged, and supporting the deformation in this direction can finally improve the visibility. A further advantage can for instance be a space saving setup, as the space available at the front face of the press seal can be used efficiently, see the exemplary embodiment for illustration. This design is referred to as "asymmetric deformation" below.

The asymmetric deformation shall also be disclosed independently of the lateral arrangement of the display region, namely also in case of a press body solely having an upper display region.

In detail, it shall be disclosed: A press seal for sealing against a line led through a through opening, having an elastomer body, a press body, and a tensioning bolt, wherein the press body can be pressed against the elastomer body by tensioning the tensioning bolt, so that the elastomer body is tensioned and contacts the line sealingly, and wherein the press body comprises a display element which becomes visible in a display region of the press body when the elastomer body reaches a tensioned state, wherein the press body comprises a first and a second press body part, the press body parts being movable with respect to each other in an axial direction parallel to the longitudinal axis of the tensioning bolt, the relative movement being supported by a deformation element, such that the press body parts are in a different relative position when the elastomer body is in the tensioned state, compared to a non-tensioned initial state, which can be read out via the display element, the deformation element (which is preferably the display element at the same time, but could in general also move a multi-part display element) being arranged between the press body parts in the axial direction, such that it is compressed in the axial direction and widened perpendicularly thereto when the tensioning bolt is tensioned, wherein the press body is adapted such that the deformation element widens, when it is compressed in the axial direction, more in a first lateral direction perpendicular to the axial direction than in a second lateral direction perpendicular to the axial direction and to the first lateral direction. This embodiment can be combined with any features described in this disclosure.

In a preferred embodiment of the asymmetric deformation (independently of whether with or without lateral display region), the press body comprises a stop which limits the widening of the deformation element in the second direction. Preferably, one of the press body parts forms the stop, particularly preferred the lower press body part. A lateral wall of the press body can form the stop, preferably a lateral wall of the lower press body part, the display region being provided at another location of this lateral wall.

In a preferred embodiment, at least one of the press body parts is made as a whole of a material at least translucent, preferably transparent; reference is made to the description above for further details. In general, the two press body parts and the deformation element are preferably one-piece respectively, each piece as such being not further dismountable without a destruction; with respect to each other, the pieces are preferably multi-part, they are formed separately and assembled then.

In general, the press body part made as a whole of the material at least translucent, is not necessarily that one which has the lateral display region, even though the latter is preferred. This embodiment, "the press body part made as a whole of a material at least translucent", shall also be disclosed independently of a lateral display region, it can for instance also be provided in a press body having only an upper display region, namely in general words in combination with "a display element that becomes visible in a display region of the elastomer body upon reaching a tensioned state of the elastomer body"; however, apart from the lateral display element, combinations with a single one or several of claims 3 to 8 are possible. Thus, combinations with other features disclosed here are possible, for instance with the asymmetric deformation.

In a preferred embodiment, the press body additionally comprises a display region at the upper side, which is exposed upwards, a display element becoming visible in this display region upon reaching the tensioned state. Preferably, this upper display region is provided in addition to the lateral one, even though one or more display regions arranged only at the upper side are possible as well, as in case of the features disclosed independently of the lateral display region of claim 1.

In a preferred embodiment, a respective display region is, independently of the lateral and/or upper arrangement, a respective inspection window which is formed in a region, which is at least translucent and enclosed by another region made of the same continuous material, being less translucent however. The two regions are formed of the same material, which is less transmissive in the region with the reduced translucency, preferably due to a reduced material thickness in the region of the inspection window compared to the enclosing region (the thickness refers to the viewing direction of the display region).

In a preferred embodiment, which shall also be disclosed independently of the lateral arrangement of the display region, the press body is multi-part, comprising a pressing press body part and a display press body part (these pieces which are "multipart" with each other are formed separately and assembled). The pressing press body part is pressed by the tensioning bolt against the elastomer body in a contact area, and the display press body part comprises the first and the second press body part, as well as the display element. As described in detail below, the pressing press body part can preferably be a component of an existing press seal, wherein the display press body part is retrofitted. Advantageously, one type of a display press body part can be combined with different pressing press body parts, so that different press seal types can be retrofitted to enable the visualization of the deformation.

Independently of these details, the display press body part has a rotationally locked seat at the pressing press body part, the two parts being not rotatable with respect to each other around the longitudinal axis of the tensioning bolt in the assembled state (a corresponding relative rotation is locked). This can for instance be advantageous as the retrofitted display press body part has a defined orientation then, so that for instance the lateral display region is oriented in the appropriate direction. However, the rotation lock can also be of interest independently of the lateral display, for instance in combination with the aforementioned "asymmetric deformation" (which can also be displayed solely at the upper side), to arrange the upper display region as desired. Further, a display press body part rotating together with the tensioning bolt during the tensioning could also be disadvantageous, as the space available at the front face of the press seal can be limited, wherein an optimal use of the space may only be achieved in certain rotational positions (see the exemplary embodiment for illustration).

In detail, it shall also be disclosed: A press seal for sealing against a line led through a through opening, having an elastomer body, a press body, and a tensioning bolt, wherein the press body can be pressed against the elastomer body by tensioning the tensioning bolt, so that the elastomer body is tensioned and contacts the line sealingly, and wherein the press body comprises a display element which becomes visible in a display region of the press body when the elastomer body reaches a tensioned state, wherein the press body comprises a first and a second press body part, the press body parts being movable with respect to each other in an axial direction parallel to the longitudinal axis of the tensioning bolt, such that the press body parts are in a different relative position when the elastomer body is in the tensioned state, compared to a non-tensioned initial state, which can be read out via the display element, wherein the press body is multi-part and comprises a pressing press body part and a display press body part, wherein an area of the pressing press body part is pressed against the elastomer body by the tensioning bolt during the tensioning, and the display press body part comprises the first and the second press body part and the display element, wherein the display press body part has a seat at the pressing press body part, secured against a rotation around the longitudinal axis of the tensioning bolt.

In a preferred embodiment, which can be realized with or without a lateral display region, the display press body part comprises a stud extending in the axial direction, the tensioning bolt protruding out of a free end of the stud. The stud has an outer contour which holds the stud rotationally locked in a through hole in the pressing press body part, the through hole having a corresponding, preferably inner contour. Therein, a polygonal contour is preferred, a hexagonal contour being particularly preferred. The display press body part comprising the stud with the outer contour is advantageous in view of the retrofitting, because existing press seals often comprise press bodies with a contoured through hole. Even if a (section wise) contoured through hole will only be required at that press body, at which the tensioning bolt engages (for instance by a flange nut), often the opposite press body, at which the screw head is arranged, is constructed identically, namely with a contoured through hole, which can reduce the number of different parts that have to be handled in manufacturing.

The invention also relates to a set with a plurality of press seals, the press bodies comprising respectively a pressing press body part and a display press body part, wherein the press seals of the set differ in the design of their respective pressing press body part, but have identically constructed display press body parts. In other words, different types of press seals are retrofitted with the same type of display press body part, the press seals differing at least regarding their pressing press body parts, preferably also regarding their elastomer bodies.

Also in this case, the display press body parts can respectively comprise a stud protruding axially, as described above, the outer contour of the stud engaging rotationally locked in the respective pressing press body part. Therein, in general, a respective display press body part is not necessarily assembled of a first and a second press body part movable with respect to each other, even though this is preferred, see the description above.

This embodiment, the set having a plurality of press seals, shall also be disclosed independently of the lateral arrangement of the display region, wherein the press seal can comprise other features disclosed here. In detail, the disclosure relates to a set with a plurality of press seals, respectively for sealing against a line led through a respective through opening, the press seals respectively having a respective elastomer body, a respective press body, and a respective tensioning bolt, wherein the respective press body can be pressed against the respective elastomer body by tensioning the respective tensioning bolt, so that the respective elastomer body is tensioned and contacts the respective line sealingly, and wherein the respective press body comprises a respective display element which becomes visible in a respective display region of the respective press body when the respective elastomer body reaches a tensioned state, wherein the press bodies respectively are multi-part and respectively comprise a pressing press body part and a display press body part, wherein an area of the respective pressing press body part is pressed against the respective elastomer body by the respective tensioning bolt during the tensioning, and the respective display press body part comprises the respective display element and the respective display region, wherein a respective display press body part further comprises a respective stud extending in an axial direction parallel to the longitudinal axis of the respective tensioning bolt, the respective tensioning bolt intersecting the respective stud and protruding from the respective stud, wherein the respective stud has an outer contour which holds the respective stud circumferentially by a form fit in the respective pressing press body part, namely in a respective through hole with a corresponding inner contour, wherein the press seals of the set differ regarding their pressing press body parts but have identically constructed display press body parts.

The invention also relates to a method of using a press seal disclosed here, or a respective set of press seals, for placing it on and sealing against a respective line.

Below, the invention is described in further detail by means of an exemplary embodiment, wherein also different combinations of the individual features can be relevant for the invention, the disclosure relating to all categories of the invention.

BRIEF DESCRIPTION OF THE DRAWINGS

In detail, it shows.

DETAILED DESCRIPTION OF THE PREFERRED EMBODIMENTS

Figure 1:
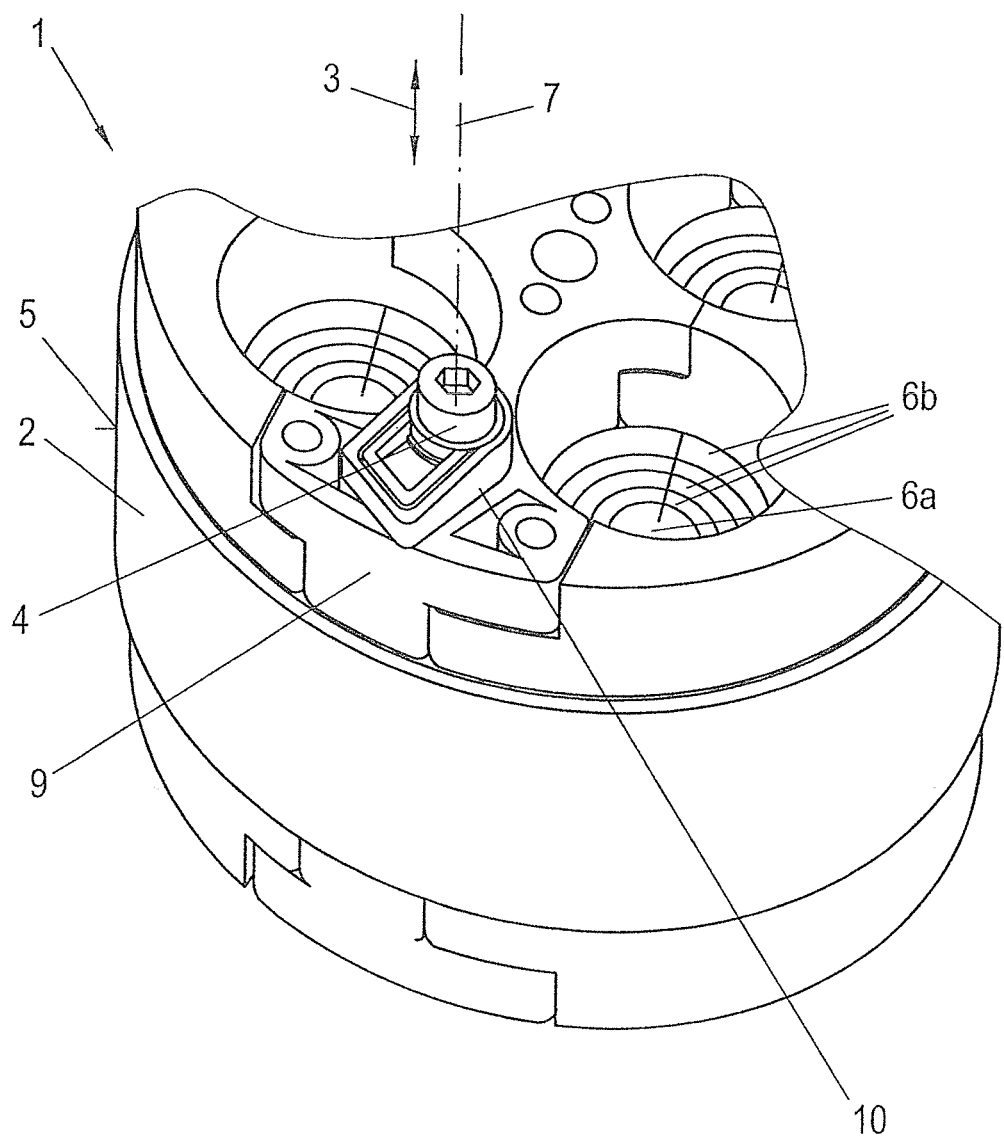
FIG. 1 the press seal with a pressing press body part holding a display press body part rotationally locked, wherein the latter comprises a lateral and an upper display region.

FIG. 1 shows a section of a press seal 1 in an oblique view. In an axial direction 3, an elastomer body 2 is held between two press bodies respectively arranged at a front face of the elastomer body 2, as discussed in further detail below, the press bodies being movable towards each other in the axial direction 3 by tensioning a tensioning bolt 4 (the press seal comprises a plurality of tensioning bolts, one of them is visible in this illustration). Consequently, the elastomer body 2 is compressed in the axial direction 3, radially it contacts with its lateral surface 5 a soffit of the through opening (not shown), and it also contacts a line led through (which is also not shown). Through openings in the elastomer body 2 provided for the lines (in this case up to four lines) are initially, namely prior to leading through a line closed respectively, namely with a respective blind plug 6a and a plurality of shells 6b for an adaption to different line diameters.

Figure 2:
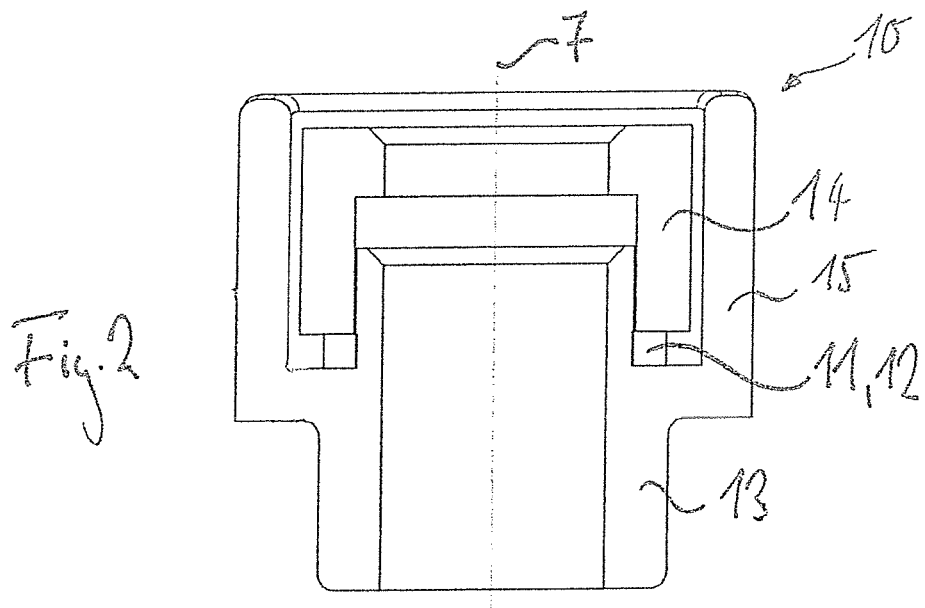
FIG. 2 the display press body part of the press seal according to FIG. 1 in a sectional side view.

With respect to the axial direction 3, lying parallel to the longitudinal axis 7 of the tensioning bolt 4, the press body is structured into a pressing press body part 9 and a display press body part 10. The latter is described more in detail referring to FIGS. 2 to 5, the pressing press body part 9 transfers the tensioning force generated by tensioning the tensioning bolt 4 over a large contact area onto the elastomer body 2. For indicating a technician during the mounting of the press seal 1 that an appropriate tensioned state of the elastomer body is reached (good sealing contact, though not too heavily deformed to avoid a material damage), the display press body part 10 comprises a display element 11, see FIGS. 2 and 3.

The display element 11 is an elastomer ring arranged circumferentially around the longitudinal axis 7 of the tensioning bolt. This elastomer ring also serves as a deformation element 12, wherein the axial relative movement of a first press body part 13a and a second press body part 13b, the first and the second press body part 13a,b both belonging to the display press body part 10, is suspended via the deformation element. When the tensioning bolt is tensioned, it acts on the second press body part 13b which is displaced towards the first press body part 13a consequently. In consequence, the deformation element 12 is increasingly deformed when the elastomer body 2 of the press seal 1 is tensioned, the deformation element being compressed in the axial direction 3 (in general words, a part of the tensioning force applied for tensioning the elastomer body deforms the deformation element 12).

Regarding its dimensions and material properties, the deformation or display element 11, 12 is designed such that it has widened radially up to a contact at the lateral wall 15 of the elastomer body 13a, at an inner surface 16 thereof, when a tensioned state of the elastomer body 2 is reached, a tensioning force being sufficient for the sealing but avoiding a damage of the material. In a region 15a, the lateral wall 15 is formed of a transparent material (polycarbonate without a dyeing agent), the region 15a forms an inspection window. This region 15a is one-piece with the remaining lateral wall 15b, formed by two-component injection molding.

Figure 3:
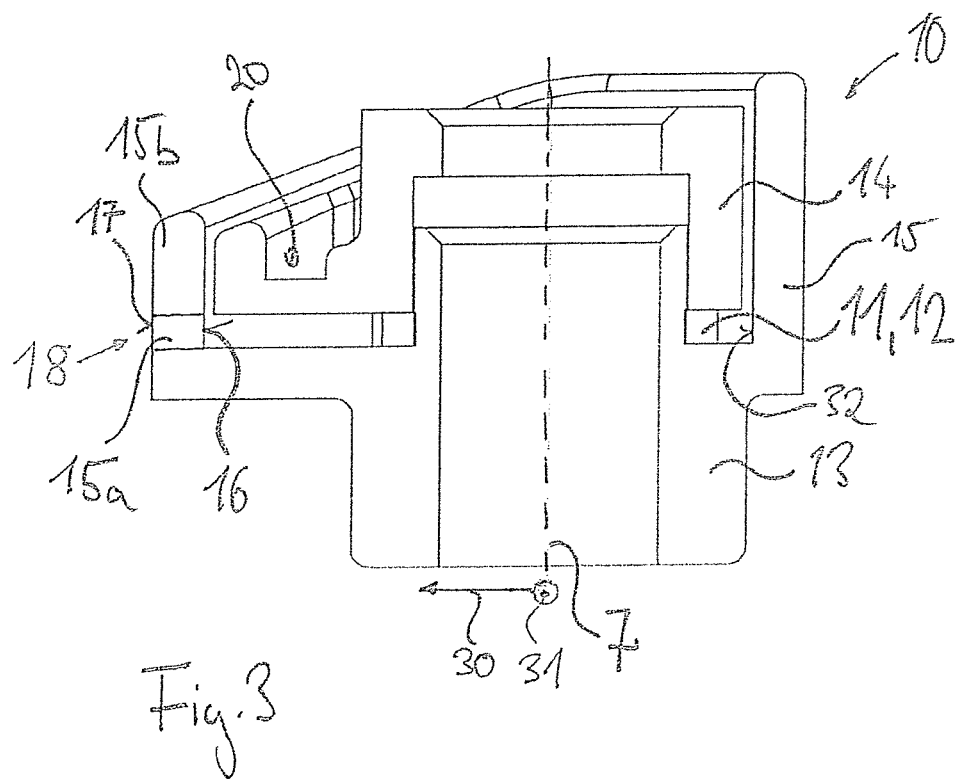
FIG. 3 again the display press body part of the press seal according to FIG. 1 in a sectional side view, wherein the sectional plane is rotated by 90° in comparison to FIG. 2.
Figure 4:
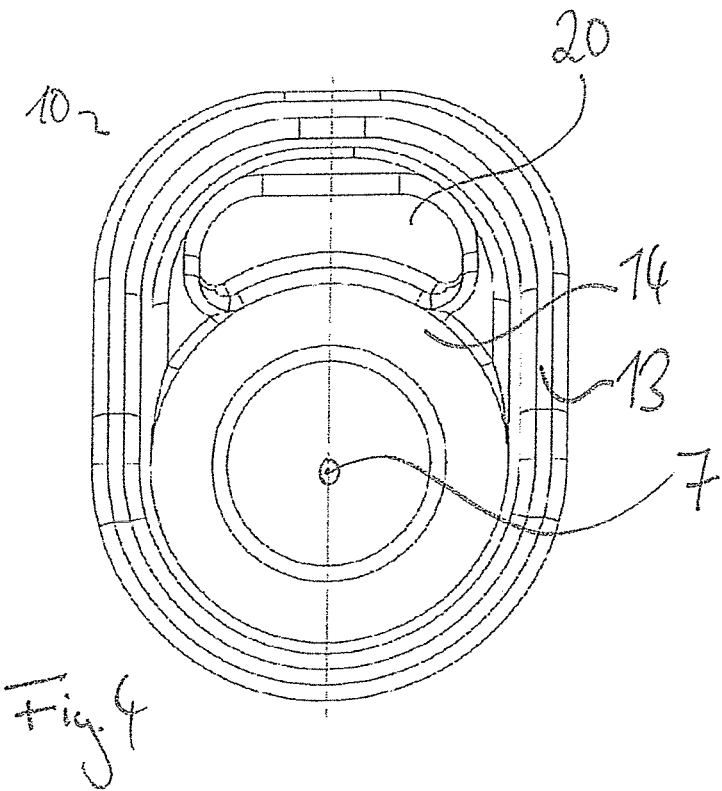
FIG. 4 the display press body part of the press seal according to FIG. 1 in a top view, seen axially.
Figure 5:
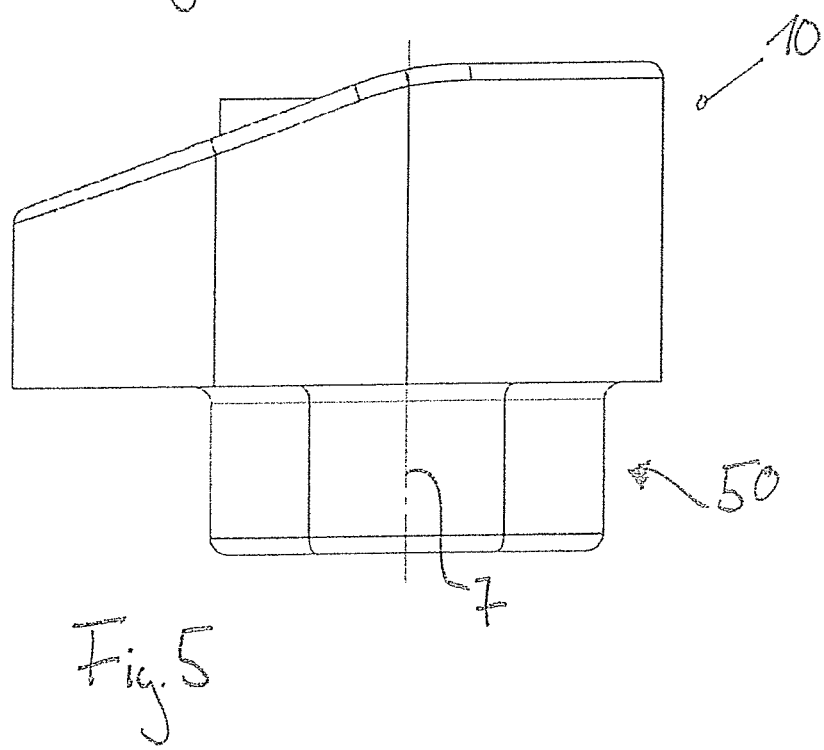
FIG. 5 the display press body part of the press seal according to FIG. 1 in a side view.

The inspection window is provided in an axially defined region, and also in the circumferential direction (referring to a circumference around the longitudinal axis 7) it extends only over that section of the lateral wall 15, which has a reduced height, namely only perpendicularly to the drawing plane in FIG. 3, not beyond. The reason for this is discussed in further detail below. When the display element 12 contacts the inner surface 16, this is visible in the transparent region 15 at the opposite outer surface 17. This can be supported by providing the display element 11 in a signal colour, for instance in yellow colour.

The display press body part 10 shown here does not only have a lateral display region 18, which is the transparent region 15a of the lateral wall 15, but also an upper display region 20, exposed in the axial direction 3 upwards. In the top view according to FIG. 4, this upper display region 20 is shown as seen by a technician looking axially onto the press seal 1. The second press body part 14 is made of a transparent material as a whole, the transparent material having a significantly reduced wall thickness in the upper display region 20. Consequently, the display element 11 is visible well there.

In detail, the display element 11 appears somewhat earlier in the upper display region 20 than in the lateral display region 18. On the one hand, this can be used for displaying two different tensioned states of the elastomer body 2. On the other hand, in case that the display regions 18, 20 shall display basically the same tensioned state, the upper display region 20 could be arranged radially close to the lateral display region 18, the axial wall thickness of the second press body part 14 being only reduced radially on the outside, as close at the lateral wall 15 of the first press body part 13 as possible.

From the oblique view according to FIG. 1, and in particular from the sectional views and the top view, it is apparent that the display press body part 10 has an asymmetrical design. With reference to the top view of FIG. 4, both sectional views of the FIGS. 2 and 3 lie perpendicular to the drawing plane, wherein the section of FIG. 2 lies horizontal and that one of FIG. 3 vertical (they contain the longitudinal axis 7 respectively). Due to the asymmetric design of the display press body part 10, the radial widening of the deformation or display element 11, 12 is not limited in a first lateral direction 30 over a comparably large radial section, whereas it is limited rather early in a second lateral direction 31 perpendicular thereto (perpendicular to the drawing plane of FIG. 3).

In a sense, the deformation is guided into the first lateral direction 30. This enables a good visualization while the overall deformation of the deformation element becomes not too large. In other words, a smaller portion of the tensioning force applied for tensioning the tensioning bolt 4 is required for the deformation element 12 to achieve the same radial widening (towards the display regions) as in case of a rotationally symmetrical widening of the deformation element 12 around the longitudinal axis 7. In the second lateral direction 31, and in a lateral direction opposite thereto, as well as in a lateral direction opposite to the first lateral direction 30 (over a circumferential angle of around 270°), the widening of the deformation element 12 is limited by the lateral wall 15 displaced inwards, forming a stop 32 there.

FIGS. 2 to 5 show different views of the same display press body part 10. Basically, starting from the geometry of FIG. 2, also a rotationally symmetrical display press body part 10 with a lateral display region 18 could be designed. The display or deformation element 11, 12 would radially contact the lateral wall 15 over the whole circumference at the same time; the display or deformation element 11, 12 would require a slightly stiffer design to indicate the same deformation state as in case of the display press body parts 10 discussed so far. In case of such a rotationally symmetrical design, the first press body part 13 could be transparent as a whole, the second press body part 14 as required (in case of radial dimensions as in FIG. 2, an upper display would rather not be possible).

However, the asymmetrical design of FIGS. 2 to 5 can also be advantageous as a display on the upper side is possible even when there is only a limited space available at the front side of the press seal 1. The display press body part 10 is further adapted for being placed at a plurality of conventional press seals. For this purpose, it comprises an axially protruding stud 50 (see FIG. 5) which is a part of the first press body part 13, see FIGS. 3 and 5 together. This stud 50 has an outer contour, a hexagonal one here. This outer contour is complementary to an inner contour of a through opening for the tensioning bolt 4 in the pressing press body part 9. The stud 50 and hence the whole display press body part 10 are held rotationally locked at the pressing press body part 9.

Therein, advantageously, the pressing press body part 9 does not require to be designed or redesigned in a specific manner for this retrofitting. Common press bodies have anyway a through opening with an inner contour in a section, in which a nut is held rotationally locked, the tensioning bolt 4 engaging in the nut (in case of the press seal 1 of FIG. 1 at the rear side front face, facing away from the viewer). The pressing press body parts 9 arranged at the opposite front faces are symmetrical to each other (mirror symmetry), the tensioning bolt head visible in FIG. 1 with an inner engagement for driving can, in case of a press seal 1 without a display press body part 10, rotate freely in the through opening with the inner contour.

In the present case, the display press body part 10 is placed in this through opening and is held rotationally locked, so that the part of the display press body part 10, which comprises the display regions 18, 20, does not rotate when the tensioning bolt 4 is tensioned, namely does not rotate towards the line or the through opening. With a corresponding display press body part 10, a plurality of different press seals 1 can be retrofitted, also due to the space-saving design.

The invention claimed is:

1. A press seal (1) for sealing against a line led through a through opening, comprising:
   an elastomer body (2);
   a press body (9, 10); and
   a tensioning bolt (4);
   wherein the press body (9, 10) can be pressed against the elastomer body (2) by tensioning the tensioning bolt (4), so that the elastomer body (2) is tensioned and contacts the line sealingly,
   wherein the press body (9, 10) comprises a display element (11) which becomes visible in a display region (18) of the press body (9, 10) when the elastomer body (2) reaches a tensioned state,
   wherein the press body (9, 10) comprises a first (13) and a second press body part (14), the press body parts (13, 14) being movable with respect to each other in an axial direction (3) parallel to a longitudinal axis (7) of the tensioning bolt (4), such that the press body parts (13, 14) are in a different relative position when the elastomer body (2) is in the tensioned state, compared to a non-tensioned initial state, which can be read out via the display element (11),
   wherein the press body (9, 10) is multi-part and comprises a pressing press body part (9) and a display press body part (10), wherein an area of the pressing press body part (9) is pressed against the elastomer body (2) by the tensioning bolt (4) during the tensioning, and the display press body part (10) comprises the first (13) and the second press body part (14) and the display element (11), and
   wherein the display press body part (10) has a seat at the pressing press body part (9), secured against a rotation around the longitudinal axis (7) of the tensioning bolt (4).

2. The press seal (1) according to claim 1, wherein the display region (18) is arranged laterally at the press body (9, 10), exposed outwards in a direction perpendicular to the longitudinal axis (7) of the tensioning bolt (4).

3. The press seal (1) according to claim 2, wherein a lateral wall (15) of the press body (9, 10), at which lateral wall (15) the display region (18) is provided, is formed of a material which is at least translucent, at least in the display region (18), wherein the display element (11) contacts an inner surface (16) of the lateral wall (15), which is visible at an opposite outer surface (17) of the lateral wall (15), when the elastomer body (2) is in the tensioned state.

4. The press seal (1) according to claim 1, further comprising a deformable deformation element (12), the relative movement of the press body parts (13, 14) being supported by the deformation element (12) arranged, in the axial direction (3) parallel to the longitudinal axis (7) of the tensioning bolt (4), between the press body parts (13, 14), the deformation element (12) being compressed in the axial direction (3) and being widened perpendicularly thereto when the tensioning bolt (4) is tensioned.

5. The press seal (1) according to claim 4, wherein the deformation element (12) encloses the tensioning bolt (4) in a sectional plane lying perpendicular to the longitudinal axis (7) of the tensioning bolt (4).

6. The press seal (1) according to claim 4, wherein the deformation element (12) is also the display element (11).

7. The press seal (1) according to claim 4, wherein the press body (9, 10) is adapted such that the deformation element (12) widens, when the elastomer body (2) is tensioned and the deformation element (12) is compressed in the axial direction (3), more in a first lateral direction (30) perpendicular to the axial direction (3) than in a second lateral direction (31) perpendicular to the axial direction (3) and to the first lateral direction (30).

8. The press seal (1) according to claim 7, wherein the press body (9, 10) comprises a stop (32), which is formed by one of the press body parts (13, 14), wherein the stop (32) limits the widening of the deformation element (12) in the second lateral direction (31) when the elastomer body (2) is tensioned and the deformation element (12) is compressed in the axial direction (3).

9. The press seal (1) according to claim 1, wherein at least one of the press body parts (13, 14) is formed as a whole of a material being at least translucent.

10. The press seal (1) according to claim 2, wherein the press body (9, 10) additionally comprises an upper display region (20) at an upper side, which is exposed upwards in the axial direction (3), the display element (11) of the press body (9, 10) becoming visible in the upper display region (20) when the tensioned state of the elastomer body (2) is reached.

11. The press seal (1) according to claim 1, wherein the display region (20) is arranged at an upper side, forming an upper display region (20) exposed upwards in the axial direction (3), the display element (11) of the press body (9, 10) becoming visible in the upper display region (20) when the tensioned state of the elastomer body (2) is reached.

12. The press seal (1) according to claim 1, wherein the display region (18) is an inspection window, wherein the inspection window (18, 20) is formed as a transparent region (15*a*) in a material which is at least translucent, the transparent region (15*a*) surrounded by a region being only translucent, this region being formed of the same continuous material being at least translucent.

13. The press seal (1) according to claim 1, wherein the display press body part (10) comprises a stud (50) extending in the axial direction (3), the tensioning bolt (4) intersecting the display press body part (10) and protruding from the stud (50), wherein the stud (50) has an outer contour which holds the stud (50) circumferentially by a form fit in a through hole in the pressing press body part (9), the through hole having a corresponding inner contour.

14. A set comprising a plurality of press seals (1) each according to claim 1,
   wherein the respective display press body part (10) each comprises the respective display element (11) and the respective display region (18),
   wherein each respective display press body part (10) further comprises a respective stud (50) extending in the respective axial direction (3), the respective tensioning bolt (4) intersecting the respective stud (50) and protruding from the respective stud (50),
   wherein the respective stud (50) has an outer contour which holds the respective stud (50) circumferentially by a form fit in the respective pressing press body part (9), in a respective through hole with a corresponding inner contour, and wherein the press seals (1) of the set differ regarding their pressing press body parts (9) but have identically constructed display press body parts (10).

\* \* \* \* \*